Nov. 8, 1938.   M. P. DE MOTTE   2,136,075
GAS DELIVERY APPARATUS
Filed Jan. 18, 1936
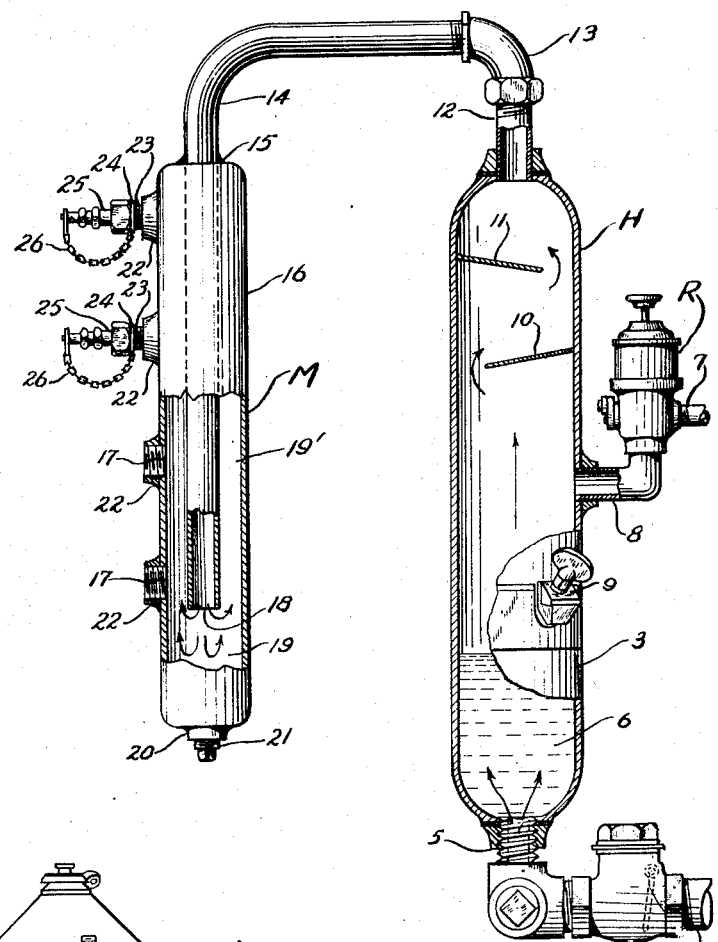
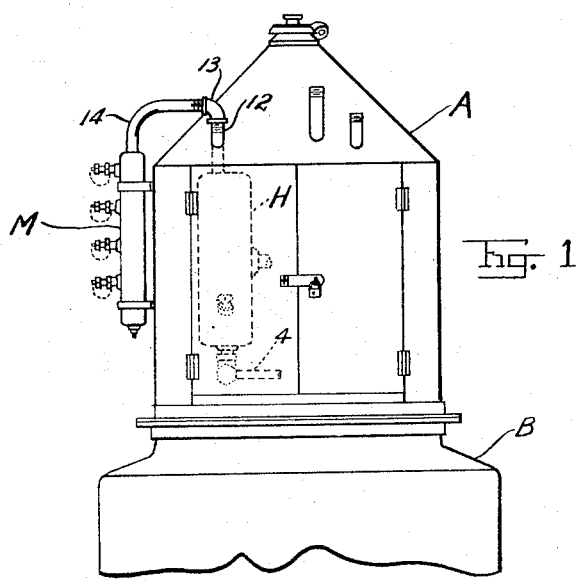
INVENTOR
MAURICE P. DE MOTTE
BY
ATTORNEY Patented Nov. 8, 1938

2,136,075

UNITED STATES PATENT OFFICE 2,136,075

GAS DELIVERY APPARATUS

Maurice P. De Motte, Indianapolis, Ind., assignor to The Prest-O-Lite Company, Inc., a corporation of New York Application January 18, 1936, Serial No. 59,685

3 Claims. (Cl. 48—192)

This invention relates to gas delivery apparatus adapted to insure the delivery of gases free of so-called "entrained moisture." More specifically this invention relates to acetylene delivery apparatus comprising a hydraulic back-pressure arrester and a combined moisture trap and outlet manifold; and also to an improved moisture trap and outlet manifold applicable to acetylene generating apparatus.

In the generation of acetylene by the reaction of calcium carbide and water, it is the usual method to contact the carbide and the water by feeding granular carbide into a body of water in the generating chamber. Since the reaction of calcium carbide and water is highly exothermic, the temperature during generation tends, in the absence of an excess of water, to become great enough to approach the decomposition temperature of acetylene. To hold the temperature of generation within safe limits, a considerable excess of water over that necessary to react the carbide is usually provided in the generating chamber. The heat capacity of this relatively large body of water limits the temperature rise.

As granular calcium carbide is fed into a body of water there is a simultaneous production of acetylene gas, calcium hydrate, and water vapor or steam produced by the vaporization of portions of the water adjacent each carbide granule. As each granule of carbide settles down through the water, bubbles of acetylene gas ascend from it, carrying with them minute particles of the calcium hydrate and also a portion of the steam previously generated. As each acetylene bubble passes upwardly it absorbs water vapor from the body of water and is also cooled by its contact with the water, which produces a condensation of the steam carried by the bubble. Each acetylene bubble then soon becomes saturated with water vapor. The condensation of the transported steam produces a fog or mist of very fine water particles, centering especially around the minute particles of reacted carbide, which act as nuclei. Upon bursting through the surface of the water into the space in the generating chamber above the water level, the acetylene carries the fog or mist into this space. In its passage from the generating chamber the acetylene also carries this fog or mist, now known as "entrained moisture", along with it.

When supplying acetylene to combustion apparatus it is the usual practice to provide a hydraulic back-pressure arrester between the generator and the delivery line. The usual hydraulic arrester includes a casing containing a body of water providing a seal for a check-valve, and an attached pressure relief valve. The check-valve and water seal are adapted to prevent the travel of gases or flash-backs from the combustion apparatus or the supply line back to the generator, and the relief valve is adapted to discharge gas into the atmosphere to relieve excessive pressure.

When the acetylene passes through the water forming the seal in the hydraulic arrester, the water removes a small number of the heavier particles of entrained moisture, but if the flow is at all rapid the ebullition and agitation of the water in the arrester tend to produce a greater amount of entrained moisture in the acetylene.

When the acetylene passes into the delivery line from the hydraulic arrester, or directly from the generator, the entrained moisture will be carried to the combustion apparatus, such as a blowpipe, and cause spitting and other objectionable incidents. In addition, the entrained moisture may condense or collect in a pool in the line, and pass to the blowpipe in the form of slugs, especially when hose having curves and low spots is used as all or a portion of the supply line. Such pools obstruct the flow and cause variations in the pressure at the blowpipe and the slugs extinguish the flame and cause back-firing and popping. In both instances, either the direct passage of entrained moisture or the collection and passage of slugs of water, a reduction in the speed of welding or cutting and a decrease in the quality of the work performed, is the result.

Accordingly, it is quite important to remove the entrained moisture carried by the acetylene. Furthermore, since acetylene generators usually supply a plurality of blowpipes it is also advantageous to provide a manifold to act as a gas-distributing point, which will produce a more even pressure and flow to each individual blowpipe.

It is an object of this invention to provide a combination moisture trap and outlet manifold which will cooperate with a hydraulic back-pressure arrester in connection with an acetylene generator to remove the objectionable moisture entrained in the combustible gas. Another object is to provide a combination trap and manifold which will act as a gas-distributing point for a plurality of blowpipes or other types of combustion apparatus. Still another object is to provide a combination moisture trap and outlet manifold which will be simple in construction and efficient in operation. These and other objects and novel features will be apparent from the following description and the accompanying drawing, in which:

Fig. 1 is a vertical view of an acetylene generator, upon which is installed a hydraulic back-pressure arrester and also a combination moisture trap and outlet manifold, constructed in accordance with this invention; and Fig. 2 is a vertical view, on a larger scale and partly in section, of details of the combination moisture trap and outlet manifold and the hydraulic back-pressure arrester of Fig. 1.

A carbide-to-water type of acetylene generator as shown in Fig. 1 may consist of a superstructure having an upper portion A, within which is disposed a carbide hopper (not shown), and a lower section B constituting a gas generating chamber containing a body of water (not shown) into which the carbide is fed to generate acetylene in the usual manner. The acetylene generated in the water chamber passes into a pipe 4, which connects with a hydraulic back-pressure arrester H, which may be placed in a protected position within the upper portion A of the superstructure, as shown. The arrester has an outlet pipe 12 connected by an elbow 13 to a pipe 14, which forms the inlet of a combination moisture trap and outlet manifold M constructed in accordance with this invention.

The hydraulic back-pressure arrester H as shown in Fig. 2 may consist of a casing 3, having an inlet 5 to which the gas is led by inlet pipe 4 through a check-valve V, placed in the inlet pipe adjacent the inlet 5. A body of liquid 6 in the lower portion of the casing forms a seal for the check-valve V; and a pressure relief valve R, adapted to relieve excessive pressures by discharging gas to the atmosphere through a pipe 7, is connected to the casing by a conduit 8. The liquid, usually water, may be introduced into the arrester through an opening closed by means of a filling and inspection plug 9. A series of baffles 10 and 11 is provided in the upper portion of the hydraulic arrester to prevent the loss of sealing water through direct projection over into the manifold M. In passing through the body of water in the lower portion of the arrester, the acetylene will tend to pick up further moisture, a portion of which the baffles 10 and 11 will intercept and return to the body of water 6.

The combination moisture trap and outlet manifold M of Fig. 2 consists of a relatively long and narrow, enclosed tubular casing 16 which is provided with a plurality of identical outlet openings, such as 17, in a vertical row along one side. The inlet pipe 14 projects through the top of casing 16 and is secured to the casing by a gas-tight joint formed in a suitable manner, such as by weld 15. The inlet pipe has an imperforate wall and extends axially into the casing to an outlet 18 which is positioned below the lowest of the outlet openings 17 in the side of the casing. Acetylene carrying entrained moisture and flowing into the combination moisture trap and outlet manifold through the inlet pipe 14 will be discharged into a lower portion 19 of the casing. There the direction of flow of acetylene will be reversed and its velocity diminished, since the internal diameter of the casing 16 is considerably greater than the internal diameter of the pipe 14. Due to the sudden reversal of flow and the greater weight of the droplets of entrained moisture, the droplets will settle downwardly and collect in a pool in the bottom of the casing, while the acetylene will flow into the annular chamber 19' in the upper portion of the casing and then to the side outlet openings 17. A removable plug 21 in a bushing 20, secured to the casing at a drain opening at the lower end of the casing, is provided to permit drainage of the collected moisture.

Each of the outlet openings in the side of the casing is provided with an internally threaded bushing 22 secured to the outside of the casing; and each of these bushings is adapted to receive a nipple 23, to which can be attached a hose or conduit leading to combustion apparatus or a blow-pipe (not shown). When not in use, any outlet may be closed by a plug 25, which is connected by a chain 26 to a collar 24 encircling the nipple 23 to prevent the loss or misplacement of the plug. Accordingly, the manifold M is so constructed that one or more outlet conduits can be connected to the gas supply equipment, and any or all of the outlets can be closed, as desired. As shown in Fig. 1, all of the outlets of the manifold face away from the generator so they will be easily accessible.

Assuming that hoses or pipes leading to the blow-pipe or combustion apparatus are attached to the nipples 23, the acetylene carrying entrained moisture will pass from the generating chamber and through the water sealed check-valve into the back-pressure arrester H, where some moisture will be separated from the gas by the baffles 10 and 11. Thence, the gas discharges through the outlet 12 into the combination moisture trap and outlet manifold where it will be further freed of objectionable entrained moisture. From there the acetylene will pass to the outlets on the side of the combination moisture trap and outlet manifold and into the hoses or lines attached to the outlets, and thence to the combustion apparatus or blowpipes.

It will be understood that various changes may be made in the apparatus, as disclosed, without departing from the principles of this invention; that certain parts of the apparatus may be used without others; and that the invention is adapted to be used with other types of gas generating equipment than the one disclosed herein.

What is claimed is:

1. A combined moisture trap and outlet manifold comprising a substantially long and narrow vertical casing having a plurality of vertically spaced outlets in the side thereof; and an imperforate gas supply pipe entering the top end of said casing and extending to a point within said casing below the lowest of said side outlets, for conducting moisture-containing combustible gas to the lower portion of said casing.

2. In acetylene generating and supply apparatus, the combination of a hydraulic back-pressure arrester adapted to be connected to a source of acetylene gas and having means for intercepting moisture carried by the gas flowing therethrough; a combination moisture trap and gas outlet manifold including an enclosed substantially long and narrow vertical casing having a plurality of outlets at predetermined heights in the side thereof, and an imperforate gas supply pipe communicating with the outlet of said arrester and entering the top of said casing and extending in spaced relation to the inside surface of said casing to a point below the lowest of said side outlets.

3. A combined moisture trap and connection manifold, for attachment to the outlet of a hydraulic back-pressure arrester having an inlet communicating with an acetylene generator, to remove objectionable entrained moisture from acetylene gas supplied by the acetylene generator through said arrester to a plurality of oxy-acetylene torches, such combined trap and manifold comprising a downwardly depending gas inlet pipe, an elongated narrow casing embracing said pipe at its top and being otherwise spaced therefrom to provide a gas expansion chamber around and below said pipe and a moisture collecting basin in the bottom thereof, and a plurality of gas outlets in the wall of said casing above the lower end of said pipe, each outlet being provided with a closure plug for sealing its outlet when not in use.

MAURICE P. DE MOTTE.